US012127993B1

(12) United States Patent
Peng et al.

(10) Patent No.: US 12,127,993 B1
(45) Date of Patent: Oct. 29, 2024

(54) MASSAGER

(71) Applicants: Kun Peng, Shaodong (CN); Yong Liang, Zhongshan (CN); Liquan Shen, Shenzhen (CN)

(72) Inventors: Kun Peng, Shaodong (CN); Yong Liang, Zhongshan (CN); Liquan Shen, Shenzhen (CN)

(73) Assignees: Kun Peng, Shaodong (CN); Yong Liang, Zhongshan (CN)

( * ) Notice: Subject to any disclaimer, the term of this patent is extended or adjusted under 35 U.S.C. 154(b) by 0 days.

(21) Appl. No.: 18/591,244

(22) Filed: Feb. 29, 2024

(51) Int. Cl.
*A61H 19/00* (2006.01)
*A61H 23/02* (2006.01)

(52) U.S. Cl.
CPC ......... *A61H 19/44* (2013.01); *A61H 23/0254* (2013.01); *A61H 2201/0153* (2013.01); *A61H 2201/169* (2013.01); *A61H 2201/5007* (2013.01); *A61H 2201/5025* (2013.01)

(58) Field of Classification Search
CPC .... A61H 19/40; A61H 19/44; A61H 23/0254; A61H 2201/0153; A61H 2201/169; A61H 2201/5007; A61H 2201/5025
USPC .......................................................... 600/38
See application file for complete search history.

(56) References Cited

U.S. PATENT DOCUMENTS

2013/0110017 A1* 5/2013 Imboden .................. A61H 1/00 601/46
2013/0178769 A1* 7/2013 Schmidt ............. A61H 23/0263 601/46
2013/0261385 A1* 10/2013 Zipper ............... A61H 23/0263 600/38
2014/0378759 A1* 12/2014 Fang ...................... A61H 23/02 600/38
2016/0184178 A1* 6/2016 Hahr ...................... A61H 23/02 600/38
2018/0185237 A1* 7/2018 Baetica .................. G08C 17/02

* cited by examiner

*Primary Examiner* — Samuel G Gilbert
(74) *Attorney, Agent, or Firm* — Daniel M. Cohn; Howard M. Cohn

(57) ABSTRACT

A massager includes a massager main body, a driving source, a vibrating piece, and a vibrating assembly. The massager main body includes an installing portion and a massage portion connected to each other. The installing portion defines an installing cavity. The massage portion defines an accommodating cavity. The driving source is installed in the installing cavity. A first end of the vibrating piece is connected to the driving source and is driven to vibrate. A second end of the vibrating piece extends out of the installing cavity and is located on one side of the massage portion. The vibrating assembly is installed in the accommodating cavity and enables the massage portion to vibrate. The massage portion and the vibrating piece extend into a human body cavity and massage the human body cavity. A length of the vibrating piece is less than a length of the massage portion.

20 Claims, 9 Drawing Sheets

B-B

MASSAGER

TECHNICAL FIELD

The present disclosure relates to a technical field of massage devices, and in particular to a massager.

BACKGROUND

Most of massagers on the market use a single direct current (DC) motor to vibrate, so as to realize a massage function. Functions of massagers are relatively single and lack diversity and adaptability, which easily leads to a poor user experience of users.

SUMMARY

Embodiments of the present disclosure provide a massager that improves a user experience of a user.

The massager comprises a massager main body, a driving source, a vibrating piece, and a vibrating assembly.

The massager main body comprises an installing portion and a massage portion. The installing portion and the massage portion are connected to each other. The installing portion defines an installing cavity. The massage portion defines an accommodating cavity. The driving source is installed in the installing cavity. A first end of the vibrating piece is connected to the driving source and is driven to vibrate by the driving source. A second end of the vibrating piece extends out of the installing cavity and is located on one side of the massage portion. The vibrating assembly is installed in the accommodating cavity and enables the massage portion to vibrate. The massage portion and the vibrating piece are configured to extend into a human body cavity and massage the human body cavity. A length of the vibrating piece is less than a length of the massage portion.

In one optional embodiment, a groove is defined on an outer wall of the massager main body. At least a portion of the vibrating piece is disposed in the groove.

In one optional embodiment, the vibrating piece comprises a connecting portion and a massage head. The connecting portion is connected to the massage head. A first end of the connecting portion away from the massage head is connected to the driving source and is driven by the driving source. A second end of the connecting portion away from the driving source is bent, so the massage head protrudes from an outer wall of the massage portion.

In one optional embodiment, the vibrating piece is disposed on a front surface of the massager. A maximum width of a projection of the massage portion on a side surface of the massager is defined as L1. A width of the massage head and a width of the outer wall of the massage portion are defined as L2. L2 is not greater than L1.

In one optional embodiment, a maximum width of a projection of the massage head on the front surface of the massager is defined as D1. D1 ranges from 6.7-16.7 mm. A maximum width of a projection of the massage portion on the front surface of the massager is defined as D2. D2 ranges from 29.8-49.8 mm.

In one optional embodiment, a connection between the vibrating piece and the installing portion is defined as an O-axis. A length of a projection of the vibrating piece on a front surface of the massager relative to the O-axis is defined as H1. A length of a projection of the massage portion on the front surface of the massager relative to the O-axis is H2. $0.4 \leq H1/H2 \leq 0.7$.

In one optional embodiment, H1 ranges from 39.3-79.3 mm, and H2 ranges from 74-174 mm.

In one optional embodiment, the driving source comprises a motor and an assembling piece. A first assembling portion is disposed on a first end of the assembling piece. A second assembling portion is disposed on a second end of the assembling piece. The second assembling portion defines an assembling space. The motor is installed in the assembling space. The vibrating piece comprises a fitting portion fixed to the first assembling portion. The first assembling portion is fixed to the fitting portion, so the vibrating piece is fixedly connected to the assembling piece.

In one optional embodiment, the installing portion further defines a fixing groove. The fixing groove communicates the installing cavity with an outside. The assembling piece further comprises a connecting rod disposed between the first assembling portion and the second assembling portion. A fixing portion is disposed on one end of the connecting rod away from the second assembling portion.

The massager further comprises a silicone piece. The silicone piece is sleeved on an outer surface of the connecting rod. A first end of the silicone piece abuts against a surface of the second assembling portion. A second end of the silicone piece abuts against a surface of the fixing portion. The connecting rod is pressed against an inner groove wall of the fixing groove through the silicone piece and is clamped in the fixing groove.

In one optional embodiment, the massage portion is a silicone keel. The massage portion is of a column structure. The accommodating cavity is formed in an interior of the silicone keel.

In one optional embodiment, the massager further comprises a battery. The battery is installed in the installing cavity and is electrically connected to the driving source and the vibrating assembly.

In one optional embodiment, a wiring groove and a through hole are defined on an outer wall of the massage portion. The through hole communicates the accommodating cavity with an outside. The through hole is located on one side of the wiring groove away from the installing portion.

In one optional embodiment, the massager further comprises a main control board. The main control board is installed in the installing cavity and is electrically connected to the battery. The driving source and the vibrating assembly are controlled by the main control board.

In one optional embodiment, the massager further comprises a button assembly. The button assembly is installed on an outer surface of the installing portion and is electrically connected to the main control board.

In one optional embodiment, a joint between the massage portion and the installing portion is smoothly transited.

In one optional embodiment, an outer surface of the vibrating piece is spaced apart from an outer wall of the massage portion.

In one optional embodiment, the installing portion comprises a first housing and a second housing. The first housing is connected to the second housing. The first housing and the second housing are enclosed to form the installing cavity.

In one optional embodiment, the massager further comprises a silicone cover sleeved on an outer side of the massager main body. A first massage piece located on one side of the vibrating piece is disposed on the silicone cover.

In one optional embodiment, at least one protrusion is disposed on one side of the first massage piece facing the vibrating piece.

In one optional embodiment, a second massage piece is disposed on the silicone cover. The second massage piece is located on one side of the massage portion away from the vibrating piece.

In the massager of the embodiments of the present disclosure, the driving source drives the vibrating piece to vibrate to generate a vibration effect, and the vibrating assembly drives the massage portion to generate the vibrating effect. When in use, both of the massage portion and the vibrating portion are configured to extend into the human body cavity and massage the human body cavity. In addition, since the vibrating piece and the massaging portion have different lengths, the vibrating piece and the massaging portion vibrate and massage different positions of the human body cavity, thereby improving the user experience of the user.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

In the drawings.

100—massager main body; 110—installing portion; 111—first housing; 112—second housing; 113—installing cavity; 120—massage portion; 121—accommodating cavity; 122—wiring groove; 123—through hole; 130—groove; 200—driving source; 210—motor; 220—assembling piece; 221—first assembling portion; 222—second assembling portion; 223—assembling space; 224—connecting rod; 225—fixing portion; 230—silicone piece; 300—vibrating piece; 310—connecting portion; 320—massage head; 330—fitting portion; 400—vibrating assembly; 410—electric motor; 420—vibrator; 430—silicone outer casing; 510—main control board; 520—battery; 530—button assembly; 600—silicone cover; 700—first massage piece; 710—protrusion; 800—second massage piece.

The realization of purposes, functional features, and characteristics of the present disclosure will be further described with reference to the embodiments and the accompanying drawings.

DETAILED DESCRIPTION

In order to make the purpose, technical solutions, and advantages of the present disclosure clear, the following further describes the present disclosure in detail with reference to accompanying drawings and embodiments.

When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as "first" and "second" are only used for the purpose of description, rather than being understood to indicate or imply relative importance or hint the number of indicated technical features. Thus, the feature limited by "first" and "second" can explicitly or impliedly include at least one feature. Unless otherwise indicated, the term "a plurality of" means two or more. The term "and/or" depict relationship between associated objects and there are three relationships thereon. For example, A and/or B may indicate A exists alone, A and B exist at the same time, and B exists alone. The character "/" generally indicates that the associated object is alternative. The terms "first", "second", "third", etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term "and/or" includes any and all combinations of one or more of the associated listed items.

Figure 1:
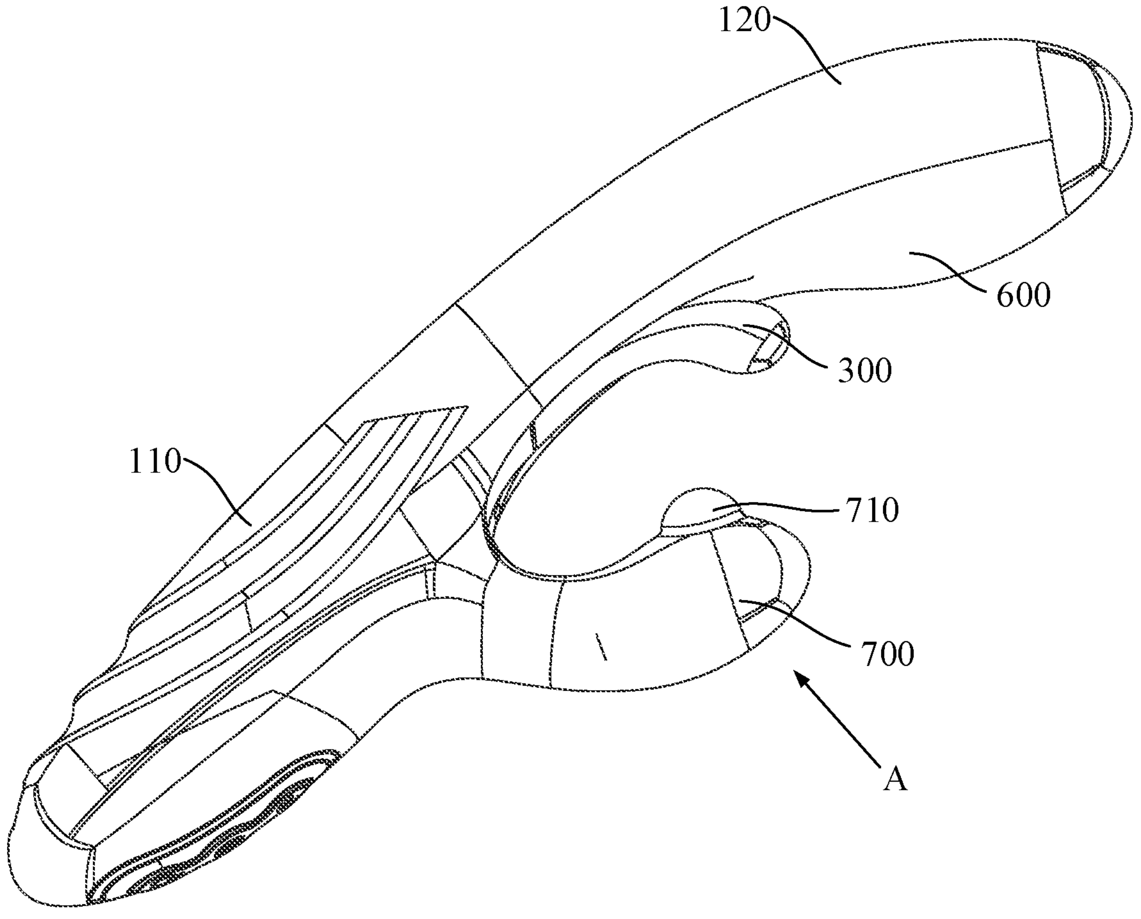
FIG. 1 is a schematic diagram of a massager according to one embodiment of the present disclosure.
Figure 2:
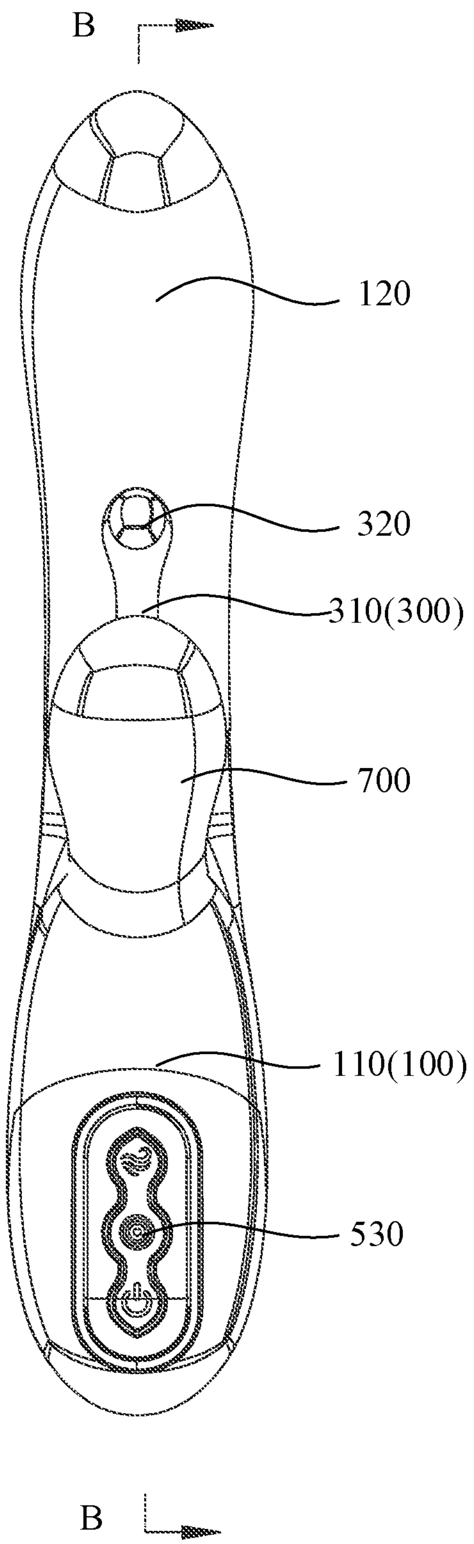
FIG. 2 is an elevational schematic diagram of the massager viewing along a direction A shown in FIG. 1.
Figure 3:
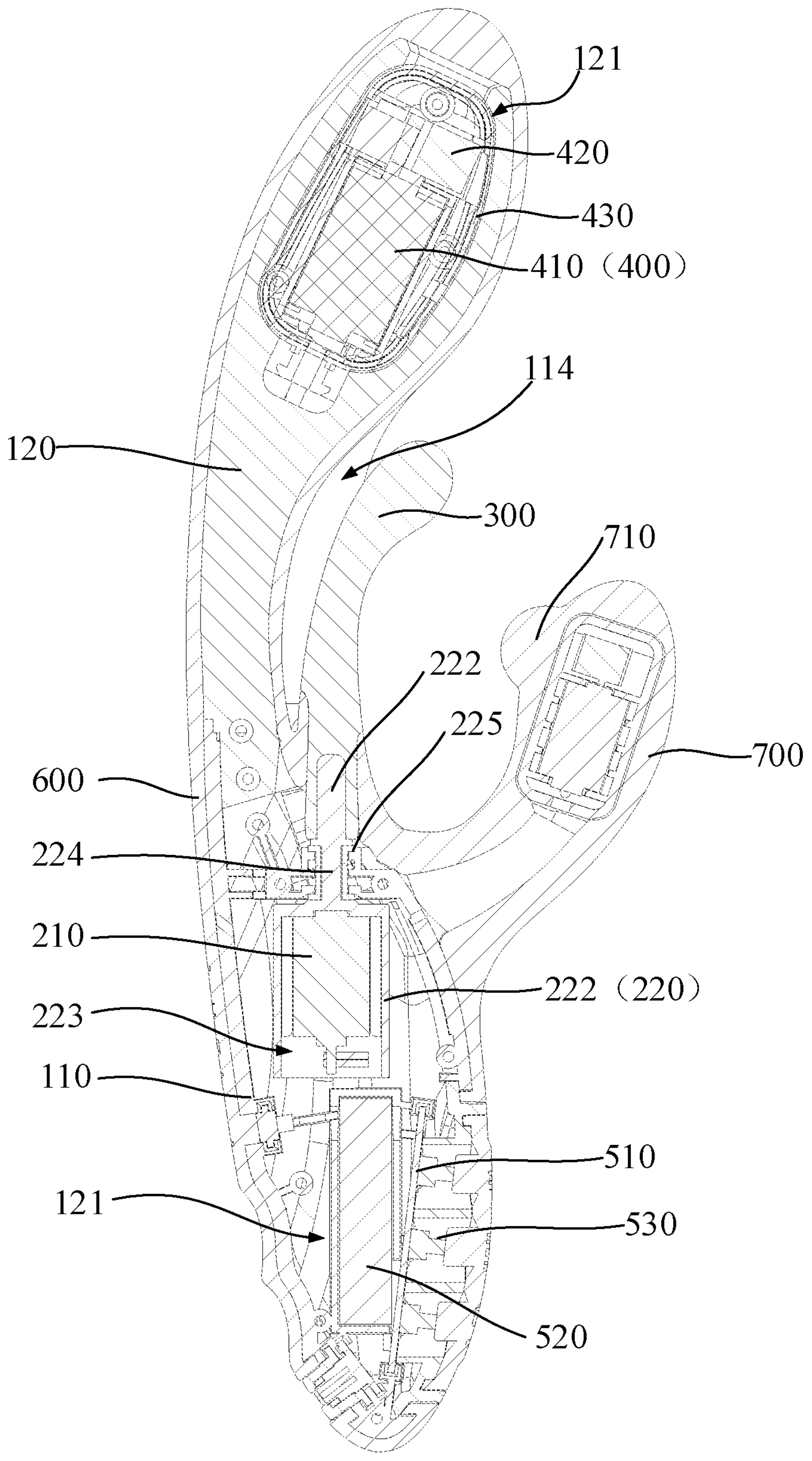
FIG. 3 is a cross-sectional schematic diagram of the massager taken along the line B-B shown in FIG. 2.

As shown in FIGS. 1-3, embodiments of the present disclosure provide a massager. The massager comprises a massager main body 100, a driving source 200, a vibrating piece 300, and a vibrating assembly 400.

As shown in FIG. 3, the massager main body 100 comprises an installing portion 110 and a massage portion 120. The installing portion 110 and a massage portion 120 are connected to each other. The installing portion 110 defines an installing cavity 113. The massage portion 120 defines an accommodating cavity 121. The massage portion 120 is configured to extend into a human body cavity and massage the human body cavity. The driving source 200 is installed in the installing cavity 113. A first end of the vibrating piece 300 is connected to the driving source 200 and is driven to vibrate by the driving source 200. A second end of the vibrating piece 300 extends out of the installing cavity 113 and is located on one side of the massage portion 120. The vibrating assembly 400 is installed in the accommodating cavity 121 and enables the massage portion 120 to vibrate.

Figure 7:
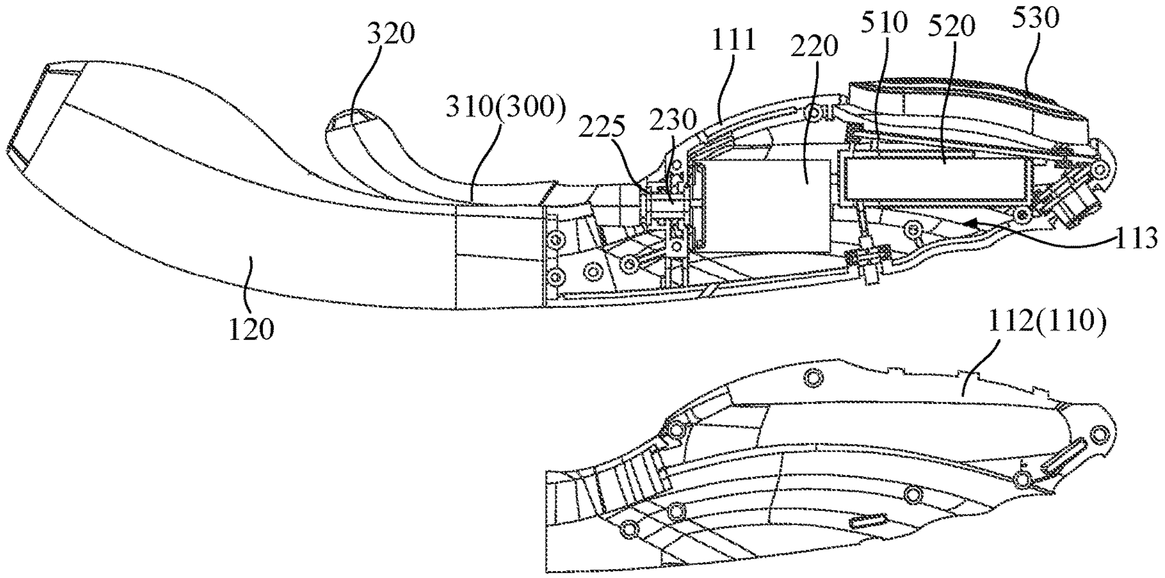
FIG. 7 is an exploded schematic diagram of the massager according to one embodiment of the present disclosure where the silicone cover is removed.
Figure 8:
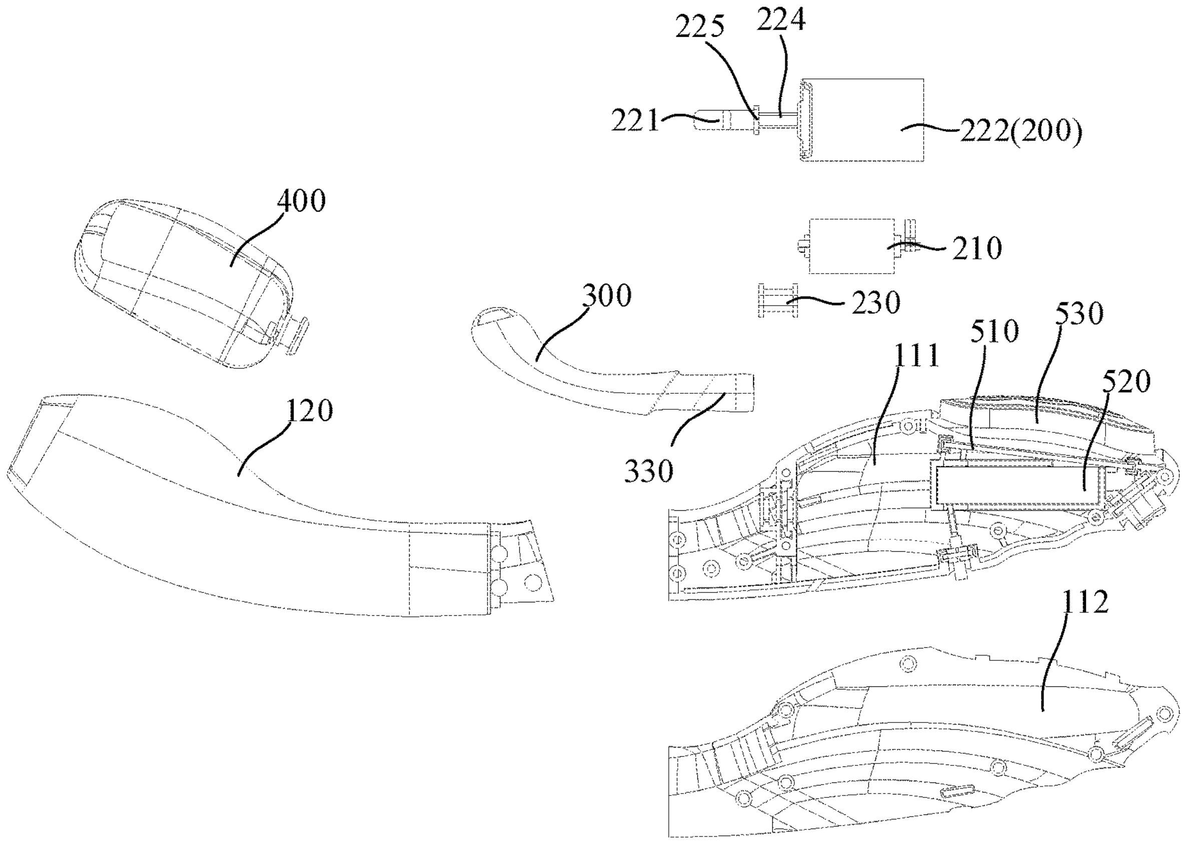
FIG. 8 is another exploded schematic diagram of the massager according to one embodiment of the present disclosure where the silicone cover is removed.

In some embodiments, as shown in FIGS. 7 and 8, the installing portion 110 comprises a first housing 111 and a second housing 112. The first housing 111 is connected to the second housing 112. The first housing 111 and the second housing 112 are enclosed to form the installing cavity 113. The first housing 111 and the second housing 112 may be fixedly connected by one or more forms of screwing, snapping, and bonding. The first housing 111 and the second housing 112 are formed by injection molding, which are simple to process and are allowed to be formed into complex shapes. Material of the first housing 111 and the second housing 112 is selected from, but not limited to, polyethylene (PE), polypropylene (PP), polyvinyl chloride (PVC), polystyrene (PS), polycarbonate (PC), polyamide (PA), and polyester (PET).

In some embodiments, as shown in FIGS. 7 and 8, the massage portion 120 is a silicone keel. The massage portion 120 is of a column structure. The accommodating cavity 121 is formed in an interior of the massage portion 120. The silicone keel has good toughness and elasticity, which improves a user experience. Of course, in other embodiments, the massage portion 120 may be made of silicone only, the accommodating cavity 121 extends in a length direction of the massage portion 120, and the vibrating assembly 400 is slidably disposed in the accommodating cavity 121. A width of the accommodation cavity 121 is designed to be slightly less than a size of the vibrating assembly 400. In this way, the vibrating assembly 400 is allowed to be fixed at different positions in the accommodation cavity 121 by tightening the massage portion 120, so that the massage portion 120 is able to massage different positions of the human body cavity in a vibration mode. It is noted that the present disclosure does not limit a specific form of the massage portion 120.

In some embodiments, a joint between the massage portion 120 and the installing portion 110 is smoothly transited. By such arrangement, edges or corners of the massage portion 120 and the installing portion 110 are prevented from scratching or compressing a skin of the human body cavity, thereby reducing a risk injury of the skin. Especially when the massager vibrates at high frequencies, the joint that is smoothly transited effectively protects the skin and prevents the skin from being irritated or hurt. At the same time, the joint that is smoothly transited also improves an overall stability of the massager. By such design, the massage portion 120 and the installing portion 110 is closely coupled, which reduces a possibility of loose or falling off of the massage portion 120 and the installing portion 110, making the massager stable and reliable during use. In addition, the joint that is smoothly transited also makes an appearance of the massager smoothly transited and refined. Whether from a perspective of appearance design or a perspective of material texture, the joint that is smoothly transited improves aesthetics of the massager and make the massager more in line with aesthetic needs of the user.

As shown in FIG. 2, the vibrating piece 300 comprises a connecting portion 310 and a massage head 320. The connecting portion 310 is connected to the massage head 320. A first end of the connecting portion 310 away from the massage head 320 is connected to the driving source 200 and is driven by the driving source 200. A second end of the connecting portion 310 away from the driving source 200 is bent, so the massage head 320 protrudes from an outer wall of the massage portion 120. The massage head 320 protrudes from an outer wall of the massage portion 120, which well fits a body curve and provides a comfortable and fitting massage experience. The massage head 320 that is protruding more accurately positions a specific area that need to be massaged, such as one of muscle groups or acupuncture points. Further, the massage head 320 is allowed to accurately apply massage power to the specific areas that need to be massaged and stimulates the specific areas that need to be massaged to meet personalized massage needs of the user. In addition, the massage head 320 that is protruding brings a strong stimulation feeling to the user during a massage process and improve pleasure and satisfaction of the user. The massage head 320 focuses energy on a smaller area, so as to increase an intensity of stimulation and local sensitivity on the specific areas that need to be massaged. The vibrating piece 300 in the embodiment of the present disclosure is integrally molded by injection molding. The vibrating piece 300 is made of material selecting from the polyethylene (PE), the polypropylene (PP), the polyvinyl chloride (PVC), the polystyrene (PS), etc., which facilitates processing and has good integration.

Figure 4:
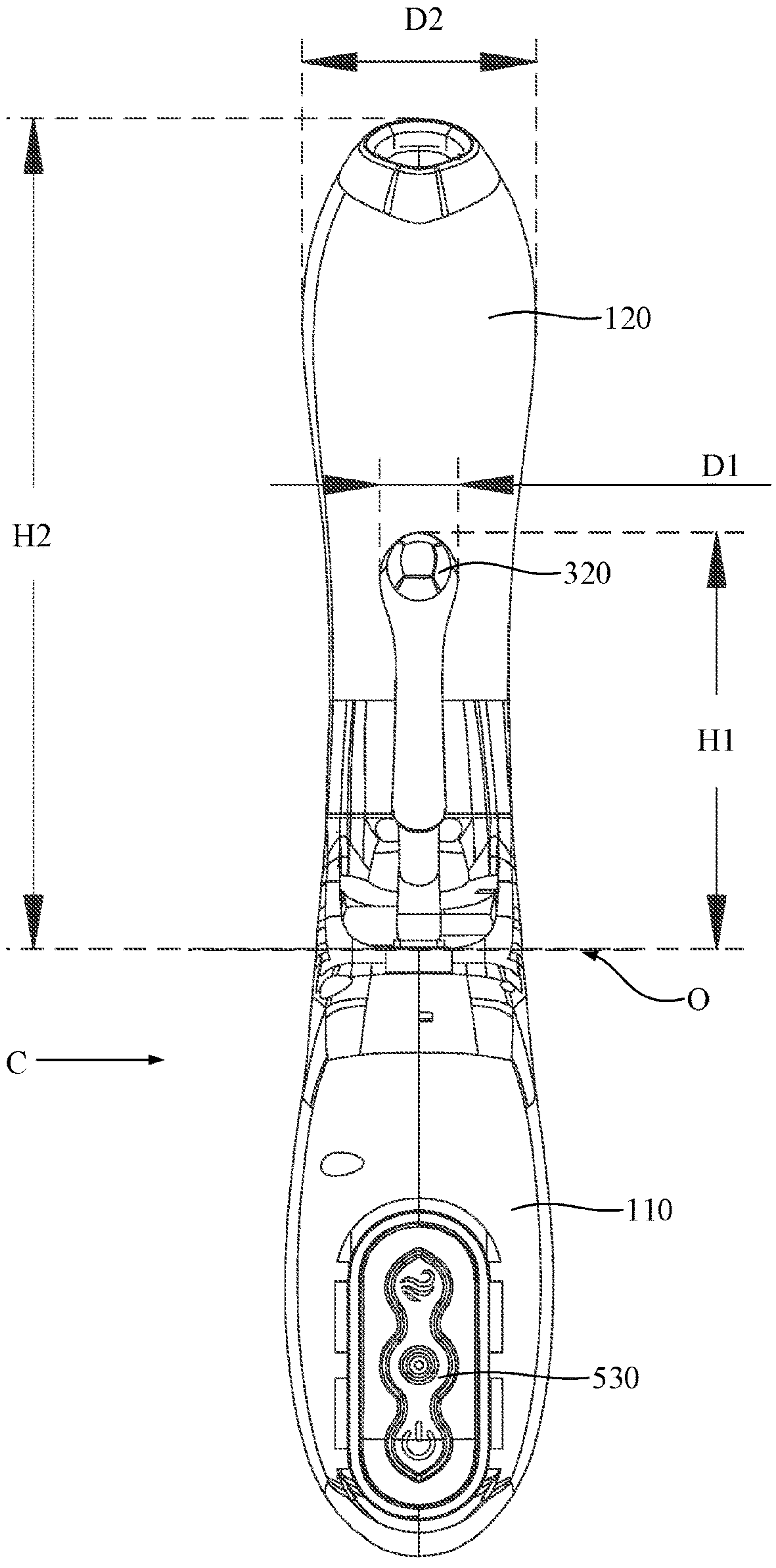
FIG. 4 is an elevational schematic diagram of the massager viewing along the direction A shown in FIG. 1 where a silicone cover is removed.
Figure 5:
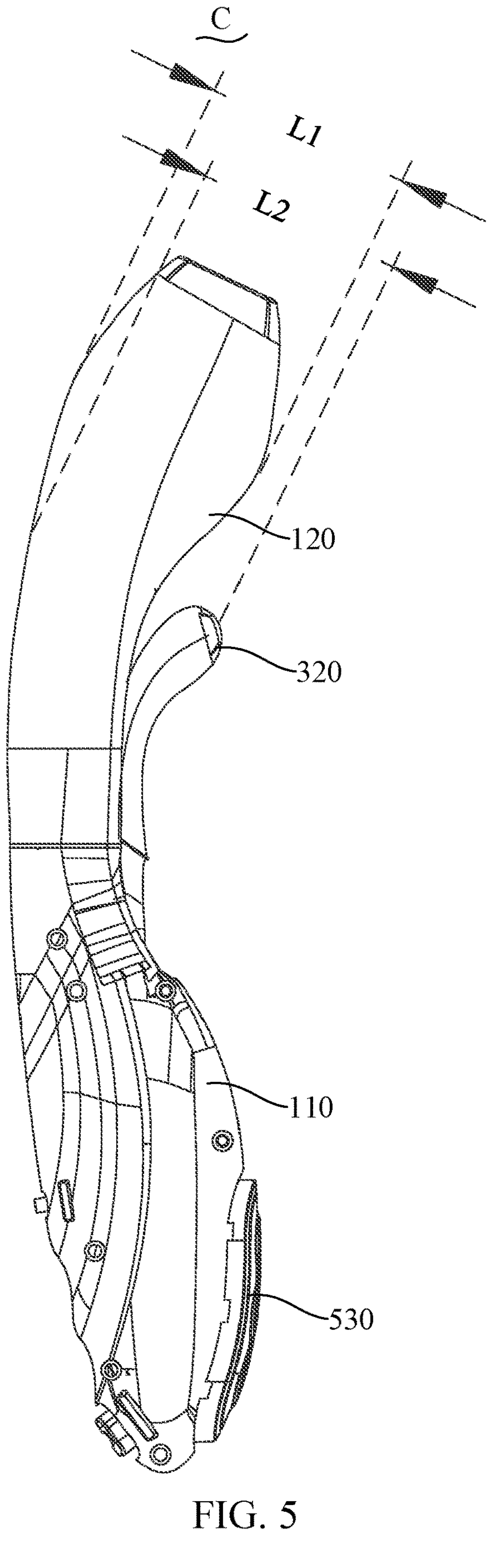
FIG. 5 is an elevational schematic diagram of the massager viewing along the direction C shown in FIG. 4
Figure 6:
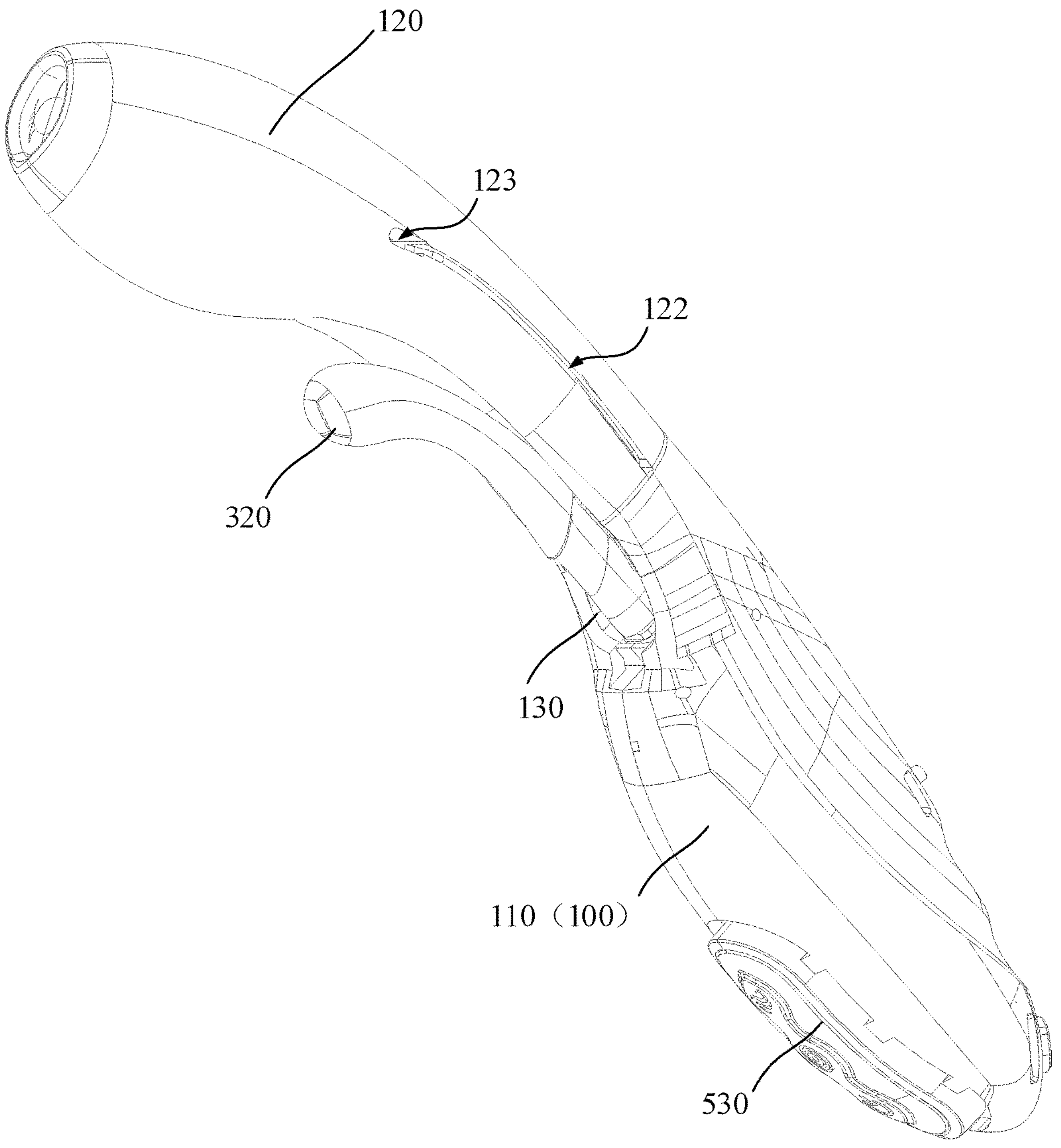
FIG. 6 is a schematic diagram of the massager according to one embodiment of the present disclosure where the silicone cover is removed.

In some embodiments, as shown in FIG. 3, a groove 130 is defined on an outer wall of the massager main body 100. At least a portion of the vibrating piece 300 is disposed in the groove 130. In this way, an overall size of the massager is reduced, making the massager lightweight, portable, and easy to store. As shown in FIGS. 1, 4, and 5, for ease of description, the vibrating piece 300 is disposed on a front surface of the massager (i.e., a direction A shown in FIG. 1). A maximum width of a projection of the massage portion 120 on a side surface of the massager (i.e., a direction C shown in FIG. 4) is defined as L1. A width of the massage head 320 and a width of the outer wall of the massage portion 120 are defined as L2. L2 is not greater than L1. In this way, it is ensured that a contact between the massager and the human body is smooth and comfortable. At the same time, by such arrangement, a distance between the massage head 320 and the massager main body 100 is prevented from being too large, and an outer diameter formed by the massage head 320 and the massage portion 120 is prevented from being too large, which avoid bringing discomfort or pain to the user. Of course, in some other embodiments, L2 may be slightly greater than L1, which is not limited thereto.

In some embodiments, the vibrating assembly 400 comprises an electric motor 410 and a vibrator 420. The electric motor 410 is configured to convert electrical energy into mechanical energy to generate vibration. The vibrator 420 is connected to a shaft of the electric motor 410. The vibrator 420 generates vibration through a rotational of the electric motor 410. In order to prevent the electric motor 410 and the vibrator 420 from external interference, the vibrating assembly 400 further comprises a silicone outer casing 430 sleeved on the electric motor 410 and the vibrator 420. In this way, the silicone outer casing 430 protects the electric motor 410 and the vibrator 420 and improve service life of the massager.

The massage portion 120 and the vibrating piece 300 are configured to extend into a human body cavity and massage the human body cavity. A length of the vibrating piece 300 is less than a length of the massage portion 120.

Figure 9:
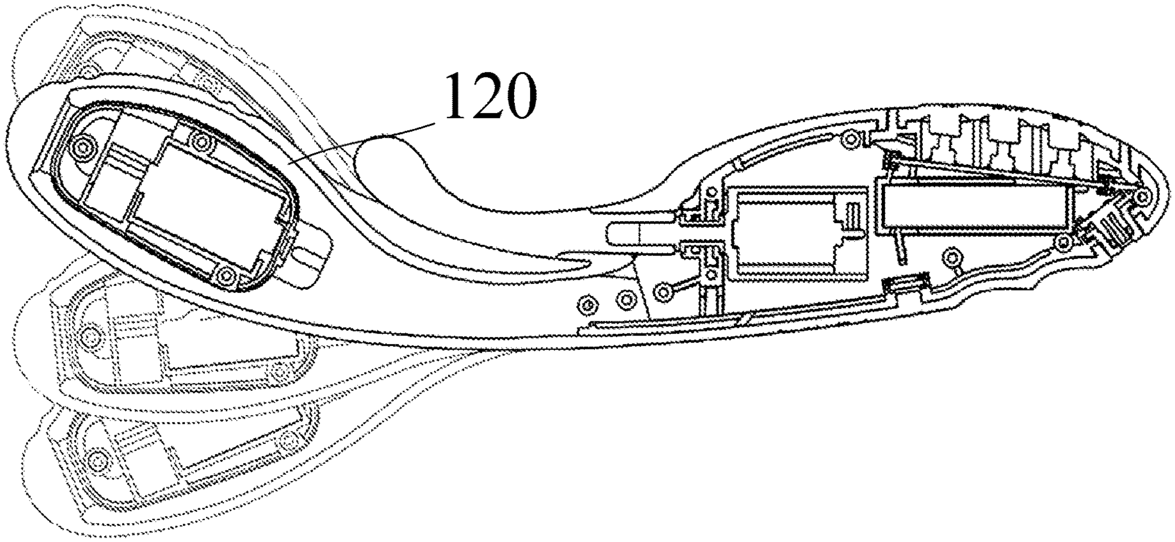
FIG. 9 is a schematic diagram of a massage portion shown in a working state.
Figure 10:
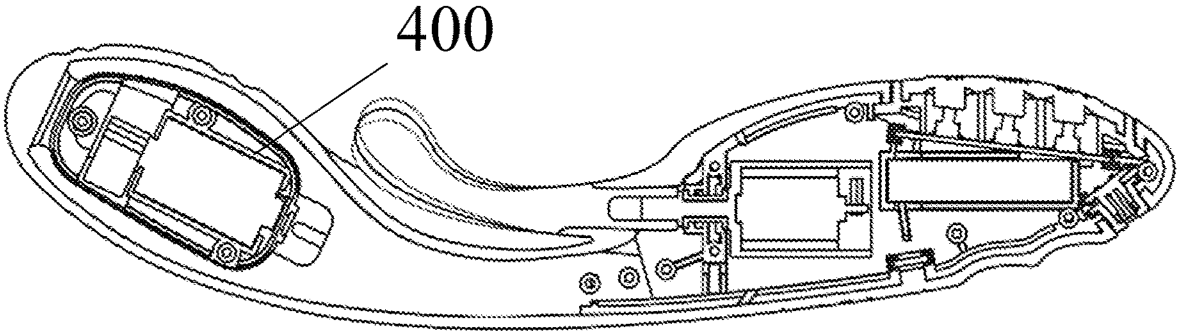
FIG. 10 is a schematic diagram of a vibrating piece shown in the working state.

Since the vibrating piece 300 and the massage portion 120 have different lengths, the vibrating piece 300 and the massage portion 120 vibrate and massage different positions of the human body cavity, thereby improving the user experience. As shown in FIGS. 9 and 10, it is understood that the massage portion 120 and the vibrating piece 300 are allowed to massage the human body at the same time, and are allowed to work separately to massage the human body.

In order to further improve the user experience, the vibrating piece 300 is mainly configured to massage a Grafenberg point of the human body cavity. As shown in FIG. 4, for ease of illustration, the vibrating piece 300 is disposed on the front surface of the massager (i.e., a direction A shown in FIG. 1). A connection between the vibrating piece 300 and the installing portion 110 is defined as an O-axis. A length of a projection of the vibrating piece 300 on the front surface of the massager relative to the O-axis is defined as H1. A length of a projection of the massage portion 120 on the front surface of the massager relative to the O-axis is H2. 0.4≤H1/H2≤0.7. In some embodiments, H1 ranges from 39.3-79.3 mm, and H2 ranges from 74-174 mm. Specifically, in the embodiment, H1 is 59.3 mm, H2 is 74-174 mm. By settings of a ratio of H1 and H2 and values of H1 and H2, it realizes that the vibrating piece 300 is mainly configured to massage the Grafenberg point of the human body cavity, and at the same time, the massage portion 120 is configured to massage the human body cavity. A configuration of the vibrating piece 300 and the setting of the ratio of H1/H2 ensure that the massage head 320 is accurately aligned with the Grafenberg point of the human body cavity, providing a more accurate, comfortable, and effective massage experience. At the same time, the setting of the length H2 of the projection of the massage portion 120 on the front surface of the massager relative to the connection point between the vibrator 300 and the installing part 110 (i.e., the O-axis) ensures that the massager satisfies massaging needs of different parts of the human body.

In order to further improve massage comfort of the massager on the human body, as shown in FIG. 4, a maximum width of a projection of the massage head 320 on the front surface of the massager is defined as D1, and D1 ranges from 6.7-16.7 mm. A maximum width of a projection of the massage portion 120 on the front surface of the massager is defined as D2, and D2 ranges from 29.8-49.8 mm. By setting size ranges of the massage head 320 and the massage portion 120, it is ensured that the massager adapts to curves and shapes of different parts of the human body, thereby providing a more fitting and comfortable massage experience. The width of the massage head 320 is appropriate to accurately massage a target area of the human body. The width of the massage portion 120 is appropriate to cover a large area of muscle tissue, making the massage comprehensive and a force on a massaged part even.

In some embodiments, the outer surface of the vibrating piece 300 and the outer wall of the massage portion 120 are spaced apart from each other (i.e., a gap is defined therebetween). By such arrangement, vibrations between the vibrating piece 300 and the massage portion 120 are effectively prevent from interfering with each other, thereby reducing instability of the massager during work and improving the use experience. At the same time, if the vibrations between the vibrating piece 300 and the massage portion 120 interfere with each other, it easily generates noise. By setting gap between the outer surface of the vibrating piece 300 and the outer wall of the massage portion 120, generation of noise is effectively reduced to improve the user experience.

In some embodiments, as shown in FIGS. 3 and 8, the driving source 200 comprises a motor 210 an assembling piece 220. A first assembling portion 221 is disposed on a first end of the assembling piece 220. A second assembling portion 222 is disposed on a second end of the assembling piece 220. The second assembling portion 222 defines an assembling space 223. The motor 210 is installed in the assembling space 223. The vibrating piece 300 comprises a fitting portion 330 fixed to the first assembling portion 221. The first assembling portion 221 is a plug, and the fitting portion 330 is a plug sleeve disposed on one side of the connecting portion 310 and adapted to a shape of the plug. During installation, the plug is inserted into the plug sleeve, so that the vibrating piece 300 is fixedly connected to the assembling piece 220. When the motor 210 is turned on, it generates rotational power. The rotational power is transmitted to the massage head 320 located on a front end of the vibrating piece 300 through the assembling piece 220. According to the crowbar principle, the rotational power of the motor 210 is converted into centrifugal force and vibration, making the vibrating piece 300 to swing and vibrate around the massager main body 100 in a high-frequency and low-amplitude manner.

In the massager of the embodiment of the present disclosure, the assembling piece 220 evenly force the motor 210 and the vibrating piece 300, thereby improving the stability and safety of the driving source 200. The assembling piece 220 also facilitates assembly and disassembly of the motor 210, thereby making the driving source 200 easy to maintain and replace. By such arrangement, the motor 210 is easily disassembled for cleaning, inspection, or replacement, and the motor 210 may be replaced with other motor of other models or specifications to meet different usage requirements. In addition, a design of the assembling piece 220 is allowed to be adjusted as needed to control the intensity and frequency of the vibrating piece 300. By changing a structure or material of the assembling piece 220, the intensity and frequency of the vibrating piece 300 are changed to achieve different massage effects. The assembling piece 220 may be integrally molded by injection molding and may be made of materials such as PE, PP, PVC, PS, etc., which is not limited thereto.

In order to facilitate an installation of driver source 200, the installing portion 110 further defines a fixing groove (not shown in the drawings). The fixing groove communicates the installing cavity 113 with an outside. The assembling piece 220 further comprises a connecting rod 224 disposed between the first assembling portion 221 and the second assembling portion 222. A fixing portion 225 is disposed on one end of the connecting rod 224 away from the second assembling portion 222. The massager further comprises a silicone piece 230. The silicone piece 230 is sleeved on an outer surface of the connecting rod 224. A first end of the silicone piece 230 abuts against a surface of the second assembling portion 222. A second end of the silicone piece 230 abuts against a surface of the fixing portion 225. The connecting rod 224 is pressed against an inner groove wall of the fixing groove through the silicone piece 230 and is clamped in the fixing groove. At this time, the first assembling portion 221 extends out to the outside and is fixed to vibrating piece 300.

In the massager of the embodiment of the present disclosure, the connecting rod 224 is pressed against the inner groove wall of the fixing groove and clamped in the fixing groove through the silicone piece 230, so that the driving source 200 is stably fixed in the installing cavity 113. When the connecting rod 224 is pressed against the inner groove wall of the fixing groove and clamped in the fixing groove, since the silicone piece 230 is elastic, the silicone piece 230 provides a certain tightening force to ensure the connecting rod 224 being firmly fixed in the fixing groove, which avoids loosening or falling off of the connecting rod 224. The silicone piece 230 also has good shock absorption and buffering properties. When the motor 210 is working, the silicone piece 230 absorbs and disperses vibration energy, and reduces an impact of the motor 210 on the fixing groove and other components, thereby improving the stability and pressure resistance of the driving source 200. In addition, the silicone piece 230 is flexible and has good shock absorption property, so the silicone piece 230 also achieve a certain noise reduction effect. The silicone piece 230 reduces a noise caused by friction between the connecting rod 224 and the fixing groove, making the driving source 200 work quieter and bringing a comfortable user experience to the user. In some embodiments, the first housing 111 and the second housing 112 are enclosed to define the fixing groove, which facilitates the installation of the driving source 200 and the installing portion 110.

In some embodiments, as shown in FIG. 3, the massager further comprises a battery 520. The battery 520 is installed in the installing cavity 113 and is electrically connected to the driving source 200 and the vibrating assembly 400. The battery 520 is electrically connected to the driving source 200 and the vibrating assembly 400 to form an independent circuit. There is no need for external power source, making the use of the massager more convenient. The user does not need to worry about an influence of external environment and is able to use the massager in his/her own way. For instance, the user may use the massager outdoors or on travelling and enjoy the comfortable experience brought by massage anytime and anywhere.

In some embodiments, a wiring groove 122 and a through hole 123 are defined on the outer wall of the massage portion 120. The through hole 123 communicates the accommodating cavity 121 with the outside. The through hole 123 is located on one side of the wiring groove 122 away from the installing portion 110. In this way, wires electrically connected to the battery 520 are fixed in the wiring groove 122 and extend into the accommodating cavity 121 through the through hole 123 to electrically connect to the vibrating assembly 400. Therefore, the wires are installed on the outer wall of the massage portion 120 in an orderly manner without being disorganized. In this way, an overall structure of the massager is simplified, installation efficiency is improved, and possible errors or confusion during the wiring process are reduced. At the same time, the wiring groove 122 neatly organizes the wires, making it difficult to find the wires visually, making the massage portion 120 look neat and orderly, and preventing the wires from being scattered on the outer wall of the massage portion, ensuring the aesthetics of the massage portion. In addition, fixing the wires in the wiring groove 122 effectively protects the wires from being damaged by the external environment. The wires are not exposed to the outside, which reduce a risk of being pulled, bent or damaged, and prolongs service life of the wires.

In some embodiments, as shown in FIG. 8, the massager further comprises a main control board 510. The main control board 510 is installed in the installing cavity 113 and is electrically connected to the battery 520. The driving source 200 and the vibrating assembly 400 are controlled by the main control board. The main control board 510 accurately controls working modes, frequencies and intensities of the driving source 200 and the vibrating assembly 400 to provide customized massage effects. The user can personalize the massage effects of the massager according to his/her own needs and preferences by adjusting parameters controlled by the main control panel 510 to obtain a more comfortable and satisfactory massage experience. In addition, the main control board 510 may also integrate massage modes and setting options, so that the massager has massage modes and functions. The user can choose different massage modes according to his/her own needs. For instance, the massage modes comprise a vibration mode, a pulse mode, a massage intensity adjustment mode, etc., which meet the massage needs of different parts of the human body and health needs. Through an intelligent control of the main control board 510, the massager provides a more personalized and diverse massage experience.

In some embodiments, the massager further comprises a button assembly 530. The button assembly 530 is installed on an outer surface of the installing portion 110 and is electrically connected to the main control board 510. In some structural forms, the button assembly 530 is installed on the front surface of the installing portion 110, which conforms to a usage habit of the user. Such an arrangement enables interaction between the user and the massager. The user is able to control the main control board 510 through the button assembly 530 to adjust the settings and parameters of the massager, thereby improving the convenience and experience of the user. Of course, in some other embodiments, the user may also adjust the settings and parameters of the massager through a touch screen or a wireless remote control, which is not limited thereto.

In some embodiments, as shown in FIG. 10, the massager further comprises a silicone cover 600 sleeved on an outer side of the massager main body 100. The silicone cover 600 is soft and elastic, which provides a comfortable touch. The silicone cover 600 wraps the massager main body 100, which avoids discomfort caused by direct contact of the skin with hard materials of the massage main body 100 and increases the comfort and pleasure of the user. Moreover, the silicone cover 600 protects the massager main body 100 and prevents external collision or friction from causing damage to the massager main body 100. At the same time, the silicone cover 600 also prevents dust, dirt, and other debris from entering the massager main body 100, keeping the massager main body 100 clean and beautiful.

In some embodiments, as shown in FIGS. 1 and 10, a first massage piece 700 located on one side of the vibrating piece 300 is disposed on the silicone cover 600. At least one protrusion 710 is disposed on one side of the first massage piece 700 facing the vibrating piece 300. It should be noted that there may be one protrusion 710 or protrusions 710, which is not limited thereto. In addition, by configuring the at least one protrusion 710 into different shapes and structures, different massage modes are achieved. For instance, if the at least one protrusion 710 is uneven, a stimulating shiatsu massage is allowed to be provided. If the at least one protrusion 710 is hemispheric, a soothing and gentle rolling massage is allowed to be provided. The at least one protrusion 710 disposed on the first massage piece 700 provide a more concentrated and stimulating massage feeling, and deepen the massage effect by stimulating specific acupuncture points or muscle groups. In addition, a vibrating device may be disposed inside the first massage member 700, which further improves the massage effect of the first massage piece 700.

Figure 11:
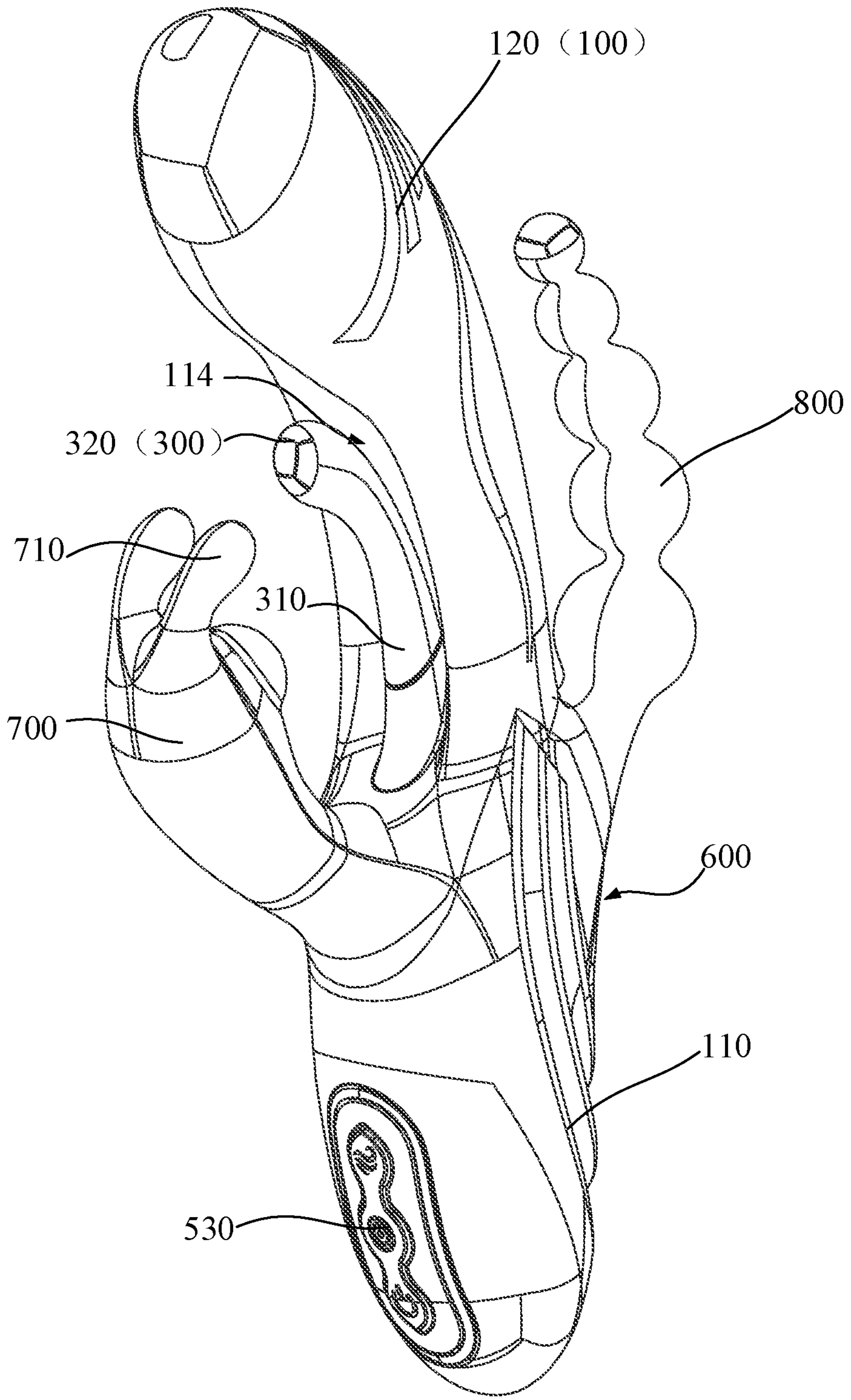
FIG. 11 is a schematic diagram of the massager according to another embodiment of the present disclosure.

In some embodiments, as shown in FIG. 11, a second massage piece 800 is disposed on the silicone cover 600. The second massage piece 800 is located on one side of the massage portion 120 away from the vibrating piece 300. The second massage piece 800 is configured to perform local massage on a specific part of the human body to provide a more accurate and directional massage effect. By such arrangement, the second massage piece 800 further increases the massage area of the massager, so the massager massages the target area more comprehensively, and provide a more comprehensive massage effect. In addition, by configuring the second massage piece 800 into different shapes and structures, different massage modes care achieved. For instance, if the second massage member 800 is uneven, the stimulating shiatsu massage is allowed to be provided. If the second massage piece 800 is a soft ball chain, the soothing and gentle rolling massage is allowed to be provided. In addition, since the second massage piece 800 is located on one side of the massage portion 120 and away from the vibrating piece 300, specific muscle groups or body parts are allowed to be massaged more accurately. The user may move the second massage piece 800 close to the target area as needed to obtain a more accurate massage effect.

It should be noted that the first massage piece 700 and the second massage piece 800 may be alternatively or may be provided at the same time, which is not limited thereto.

In the drawings of the embodiments, the same or similar numbers correspond to the same or similar components; in the description of the present disclosure, it should be understood that terms such as "upper", "lower", "left", "right", etc., indicate direction or position relationships shown based on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be included in the protection scope of the present disclosure.

What is claimed is:

1. A massager, comprising:

a massager main body, a driving source, a vibrating piece, and a vibrating assembly;

wherein the massager main body comprises an installing portion and a massage portion; the installing portion and the massage portion are connected to each other; the installing portion defines an installing cavity; the massage portion defines an accommodating cavity;

wherein the driving source is installed in the installing cavity; a first end of the vibrating piece is connected to the driving source and is driven to vibrate by the driving source; a second end of the vibrating piece extends out of the installing cavity and is located on one side of the massage portion;

wherein the vibrating assembly is installed in the accommodating cavity and enables the massage portion to vibrate; the massage portion and the vibrating piece are configured to extend into a human body cavity and massage the human body cavity; a length of the vibrating piece is less than a length of the massage portion;

wherein the driving source comprises a motor and an assembling piece; a first assembling portion is disposed on a first end of the assembling piece; a second assembling portion is disposed on a second end of the assembling piece; the second assembling portion defines an assembling space; the motor is installed in the assembling space; the vibrating piece comprises a fitting portion fixed to the first assembling portion; the first assembling portion is fixed to the fitting portion, so the vibrating piece is fixedly connected to the assembling piece;

wherein the installing portion further defines a fixing groove; the fixing groove communicates the installing cavity with an outside; the assembling piece further comprises a connecting rod disposed between the first assembling portion and the second assembling portion; a fixing portion is disposed on one end of the connecting rod away from the second assembling portion;

wherein the massager further comprises a silicone piece; the silicone piece is sleeved on an outer surface of the connecting rod; a first end of the silicone piece abuts against a surface of the second assembling portion; a second end of the silicone piece abuts against a surface of the fixing portion; and the connecting rod is pressed against an inner groove wall of the fixing groove through the silicone piece and is clamped in the fixing groove.

2. A massager, comprising:

a massager main body, a driving source, a vibrating piece, and a vibrating assembly;

wherein the massager main body comprises an installing portion and a massage portion; the installing portion and the massage portion are connected to each other; the installing portion defines an installing cavity; the massage portion defines an accommodating cavity;

wherein the driving source is installed in the installing cavity; a first end of the vibrating piece is connected to the driving source and is driven to vibrate by the driving source; a second end of the vibrating piece extends out of the installing cavity and is located on one side of the massage portion;

wherein the vibrating assembly is installed in the accommodating cavity and enables the massage portion to vibrate; the massage portion and the vibrating piece are configured to extend into a human body cavity and massage the human body cavity; a length of the vibrating piece is less than a length of the massage portion;

wherein the vibrating piece comprises a connecting portion and a massage head; the connecting portion is connected to the massage head; a first end of the connecting portion away from the massage head is connected to the driving source and is driven by the driving source; a second end of the connecting portion away from the driving source is bent, so the massage head protrudes from an outer wall of the massage portion.

3. The massager according to claim 2, wherein a groove is defined on an outer wall of the massager main body; at least a portion of the vibrating piece is disposed in the groove.

4. The massager according to claim 2, wherein the vibrating piece is disposed on a front surface of the massager; a maximum width of a projection of the massage portion on a side surface of the massager is defined as L1; a width of the massage head and a width of the outer wall of the massage portion are defined as L2; L2 is not greater than L1.

5. The massager according to claim 4, wherein a maximum width of a projection of the massage head on the front surface of the massager is defined as D1; D1 ranges from 6.7-16.7 mm; a maximum width of a projection of the massage portion on the front surface of the massager is defined as D2; D2 ranges from 29.8-49.8 mm.

6. The massager according to claim 2, wherein a connection between the vibrating piece and the installing portion is defined as an O-axis; a length of a projection of the vibrating piece on a front surface of the massager relative to the O-axis is defined as H1; a length of a projection of the massage portion on the front surface of the massager relative to the O-axis is H2; 0.4≤ H1/H2≤0.7.

7. The massager according to claim 6, wherein H1 ranges from 39.3-79.3 mm, and H2 ranges from 74-174 mm.

8. The massager according to claim 2, wherein the driving source comprises a motor and an assembling piece; a first assembling portion is disposed on a first end of the assembling piece; a second assembling portion is disposed on a second end of the assembling piece; the second assembling portion defines an assembling space; the motor is installed in the assembling space; the vibrating piece comprises a fitting portion fixed to the first assembling portion; the first assembling portion is fixed to the fitting portion, so the vibrating piece is fixedly connected to the assembling piece.

9. The massager according to claim 8, wherein the installing portion further defines a fixing groove; the fixing groove communicates the installing cavity with an outside; the assembling piece further comprises a connecting rod disposed between the first assembling portion and the second assembling portion; a fixing portion is disposed on one end of the connecting rod away from the second assembling portion;

wherein the massager further comprises a silicone piece; the silicone piece is sleeved on an outer surface of the connecting rod; a first end of the silicone piece abuts against a surface of the second assembling portion; a second end of the silicone piece abuts against a surface of the fixing portion; and the connecting rod is pressed against an inner groove wall of the fixing groove through the silicone piece and is clamped in the fixing groove.

10. The massager according to claim 2, wherein the massage portion is a silicone keel; the massage portion is of a column structure; the accommodating cavity is formed in an interior of the massage portion.

11. The massager according to claim 2, wherein the massager further comprises a battery; the battery is installed in the installing cavity and is electrically connected to the driving source and the vibrating assembly.

12. The massager according to claim 11, wherein a wiring groove and a through hole are defined on an outer wall of the massage portion; the through hole communicates the accommodating cavity with an outside; the through hole is located on one side of the wiring groove away from the installing portion.

13. The massager according to claim 11, wherein the massager further comprises a main control board; the main control board is installed in the installing cavity and is electrically connected to the battery; the driving source and the vibrating assembly are controlled by the main control board.

14. The massager according to claim 13, wherein the massager further comprises a button assembly; the button assembly is installed on an outer surface of the installing portion and is electrically connected to the main control board.

15. The massager according to claim 2, wherein a joint between the massage portion and the installing portion is smoothly transited.

16. The massager according to claim 2, wherein an outer surface of the vibrating piece is spaced apart from an outer wall of the massage portion.

17. The massager according to claim 2, wherein the installing portion comprises a first housing and a second housing; the first housing is connected to the second housing; the first housing and the second housing are enclosed to form the installing cavity.

18. The massager according to claim 17, wherein the massager further comprises a silicone cover sleeved on an outer side of the massager main body; a first massage piece located on one side of the vibrating piece is disposed on the silicone cover.

19. The massager according to claim 18, wherein at least one protrusion is disposed on one side of the first massage piece facing the vibrating piece.

20. The massager according to claim 18, wherein a second massage piece is disposed on the silicone cover; the second massage piece is located on one side of the massage portion away from the vibrating piece.

* * * * *